United States Patent [19]

Maestrello

[11] Patent Number: 4,932,610
[45] Date of Patent: Jun. 12, 1990

[54] ACTIVE CONTROL OF BOUNDARY LAYER TRANSITION AND TURBULENCE

[75] Inventor: Lucio Maestrello, Newport News, Va.

[73] Assignee: The United States of America as represented by the United States National Aeronautics and Space Administration, Washington, D.C.

[21] Appl. No.: 838,649

[22] Filed: Mar. 11, 1986

[51] Int. Cl.$^5$ .............................................. B64B 21/00
[52] U.S. Cl. .................................... 244/203; 244/204; 244/130; 114/67 A
[58] Field of Search ............... 244/204, 199, 205, 130, 244/1 N, 134 D, 203; 114/40, 67 A

[56] References Cited

U.S. PATENT DOCUMENTS

| | | |
|---|---|---|
| 2,448,966 | 9/1948 | Fales . |
| 2,739,770 | 3/1956 | Fanti et al. ............................ 244/200 |
| 2,741,692 | 4/1956 | Luke ................................. 244/134 D |
| 2,764,373 | 9/1956 | Anderson et al. . |
| 2,783,008 | 2/1957 | Bodine, Jr. . |
| 2,853,852 | 9/1958 | Bodine, Jr. . |
| 3,161,385 | 12/1964 | Kramer .................................. 244/205 |
| 3,362,663 | 1/1968 | Wehrmann . |
| 3,556,443 | 1/1971 | Kidwell . |
| 3,774,867 | 11/1973 | Quinn . |
| 3,800,121 | 3/1974 | Dean et al. ...................... 244/134 D |
| 3,820,745 | 6/1974 | Francis . |
| 4,036,457 | 7/1977 | Volkner et al. ................. 244/134 D |
| 4,073,144 | 2/1978 | Lea ........................................ 114/40 |
| 4,516,747 | 5/1985 | Lurz . |

FOREIGN PATENT DOCUMENTS

| | | |
|---|---|---|
| 850.093 | 12/1939 | France . |
| 50.700 | 2/1941 | France . |
| 50.809 | 4/1941 | France . |
| 2147082 | 5/1985 | United Kingdom ................ 244/130 |

*Primary Examiner*—Galen Barefoot
*Attorney, Agent, or Firm*—George F. Helfrich; John R. Manning; Charles E. B. Glenn

[57] ABSTRACT

The invention is a boundary flow control system and method which comprises heating elements 24 to trigger boundary layer transition and audio speakers 83 to provide acoustic suppression 51 of boundary layer turbulence 52. The trigger and suppression control are activated by a feedback amplifier 82 which reads boundary layer flow conditions using an anemometer probe 81. The active control of the boundary layer permits delay of flow separation and a reduction in skin friction drag as compared to natural flow conditions.

12 Claims, 3 Drawing Sheets

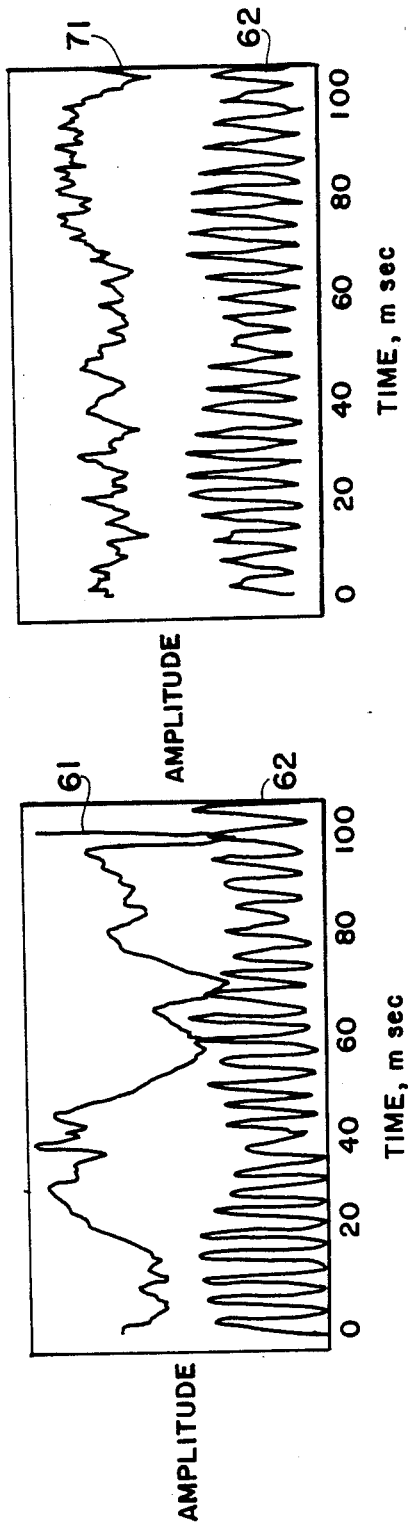
FIG. 6
FIG. 7
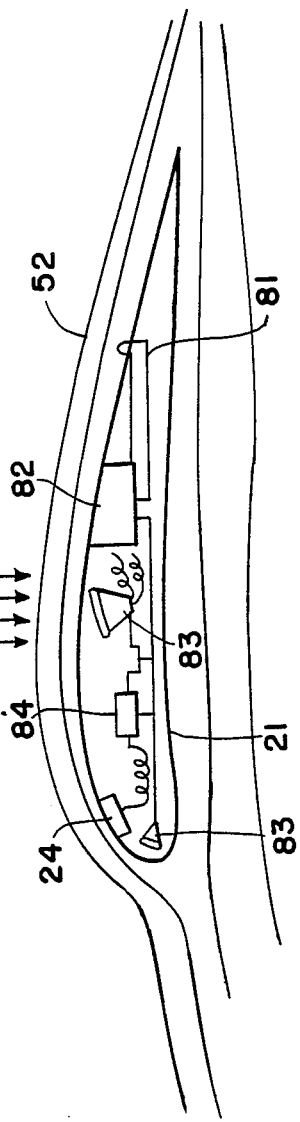
FIG. 8

ACTIVE CONTROL OF BOUNDARY LAYER TRANSITION AND TURBULENCE

ORIGIN OF THE INVENTION

The invention described herein was made by an employee of the U.S. Government and may be manufactured and used by or for the Government for governmental purposes without the payment of any royalties thereon or therefor.

TECHNICAL FIELD OF THE INVENTION

The invention is related to the aerodynamics technology field and more particularly to field of flow control in boundary layers.

BACKGROUND OF THE INVENTION

The invention is a system and a method for controlling boundary layer flow over a surface such as that formed by an airfoil, interior of a duct, or other fluid flow surfaces.

There is a long standing and continuing need, in industries concerned with fluid flow dynamics, for an effective means to control boundary layer flow conditions. The energy required to operate a particular fluid flow system is directly related to the flow conditions in the boundary layer. In fact, successful system operation may be dependent on boundary layer flow conditions. For example, an airfoil set at particular operating conditions may stall and fail to achieve useful lift when boundary layer flow is laminar, yet can continue to operate under those same conditions if turbulent flow is established in the boundary layer. Even where a system can operate successfully without boundary layer control, such control will provide significant benefits. Typically, skin friction drag may be reduced by one-third just by partially suppressing turbulent oscillations in the boundary layer.

Engineering efforts and techniques directed toward boundary layer control have been extensive and in many gases. The spectrum of techniques has spanned active and passive methods, from high energy air injection or withdrawal to vortex generators and shaping of micro-geometries. The more effective techniques have been hampered by cost, power and weight requirements, mechanical complexity and unreliability. Potentially more attractive systems, such as surface microgeometries, vortex generators and other passive methods, have provided limited results while incurring penalties of their own. Vortex generators, for example, are typically point-designed for a particular configuration, e.g., flaps down and a particular operative point. At other operating points, vortex generators create drag and icing problems while making no contribution.

Accordingly, it is an object of the present invention to provide an active means of boundary layer control wherein both transition and disturbances are controlled.

It is a further object of the present invention to reduce skin friction drag through active boundary layer control.

It is yet another object of the present invention to provide extended stall characteristics to an airfoil through turbulent boundary layer control.

A further object of the present invention is to provide an active boundary layer control system which has low power and weight requirements.

Yet another object of the present invention is to provide non-intrusive control means wherein the apparatus is flush or internal to the flow surfaces.

Still another object of the present invention is to provide localized effects which can be tailored in amplitude and frequency to match local flow conditions.

It is yet a further object to provide a boundary layer control system which is reliable and mechanically simple.

A further object of the present invention is to provide for boundary layer control by triggering flow transition with heating elements and by damping flow oscillations with audio speakers.

SUMMARY OF THE INVENTION

These and other objects of the invention are achieved s by providing a method and an electro-mechanical system for controlling boundary layer flow. The invention uses heat to cause laminar-turbulent transition and sound to control turbulent oscillations within the boundary layer.

The system comprises a skin heating element, a noise generator, necessary sensors to monitor the boundary layer flow conditions, and a feedback mechanism. Functionally, the system consists of a transition trigger and a turbulence controller, actively operated via feedback mechanism with an amplitude and time response level suitable for suppressing Is broad ranges of amplitude levels and bandwidths. The transition trigger is a heater strip or strips embedded in a thermally neutral substrate mounted flush with the surface. The controller is an acoustic source placed above or within the surface. The system achieves flow control by actively perturbing the flow with the surface heater and controlling amplitude response with sound.

The skin frictional drag is reduced because of reduced amplitude of perturbations in the boundary layer which cause a shift in effective Reynolds number to a high value (i.e., where the skin friction drag is less). In addition, the surface heating elements can be use to trigger turbulent boundary layer flow over an airfoil surface or in ducts thereby preventing flow separation caused by angle-of-attack or configuration changes. At high angles of attack, and in duct operations where flow separation is eminent, heat is applied at the flow surface causing transition from laminar to turbulent. Boundary layer tripping (from laminar to turbulent) results in a drag reduction compared to separated flow.

BRIEF DESCRIPTION OF THE DRAWINGS

A more complete appreciation of the present invention and its attendant advantages will become apparent as the same becomes better understood by reference to the following description when considered in connection with the accompanying drawings wherein:

FIG. 6 is a plot of experimental data showing the amplitude of turbulent oscillations in the boundary layer without damping;

FIG. 7 is a plot of experimental data showing the amplitude of turbulent oscillations with damping by the present invention;

FIG. 8 is a cross-sectional schematic of an airfoil showing the major components of the present invention installed therein;

DETAILED DESCRIPTION OF THE DRAWINGS

Figure 1:
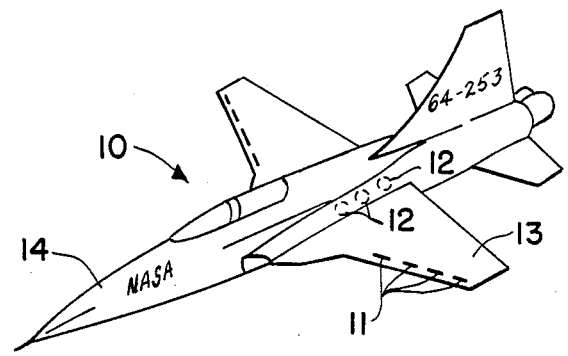
FIG. 1 is a perspective view of an aircraft showing the general configuration of the present invention.

Referring now to the drawings wherein like elements are referred to by the same reference numeral throughout the several views and more particularly to FIG. 1, a perspective view of an aircraft, designated generally by the reference numeral 10, is shown. The triggering devices of the present invention 11 are shown embedded along the leading edge of the upper wing surface 13. Acoustic control devices 12 are depicted embedded in the fuselage 14 adjacent to the wing root.

The forcing function in boundary layer velocity perturbations consists of the gradients in pressure and temperature as shown by the Navier-Stokes equations. By use of a heating element trigger located in a region of positive pressure gradient, it is possible to trip the boundary layer to turbulent flow using only small amounts of energy. Because the flow is subject to accelerating forces of the positive pressure gradient, trigger pulses are amplified and set up dominant pressure patterns downstream. These dominant patterns being more regular, can be more readily suppressed than naturally occurring patterns.

Figure 2:
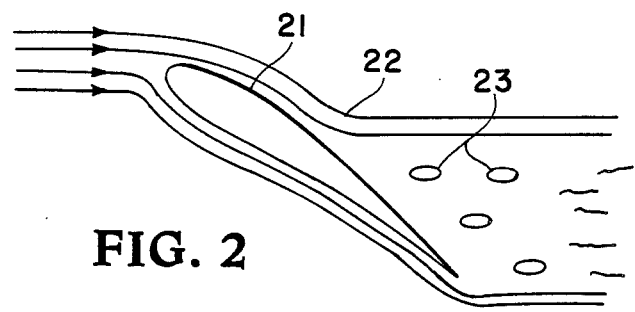
FIG. 2 is a cross-sectional depiction of an airfoil showing separated laminar flow.
Figure 3:
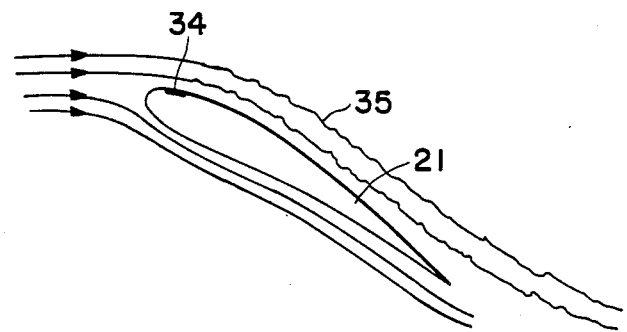
FIG. 3 is an airfoil cross-section depicting the operation of the triggering mechanism of the present invention.

Referring to FIG. 2, an airfoil 21 is shown in cross-section. Flow in this depiction is laminar. Laminar streamlines 22 are shown separating from the airfoil 21 surface leaving a wake of separated flow 23. As a comparison, FIG. 3 depicts the use of the heating elements 34 of the present invention to cause turbulent transition. The turbulent flow 35 re-energizes the boundary layer and thereby prevents separation from airfoil 21. Heating element 34 is mounted flush with the surface of airfoil 21. There is no parasitic drag and when the element is not in use, no flow disturbances occur.

Figure 4:
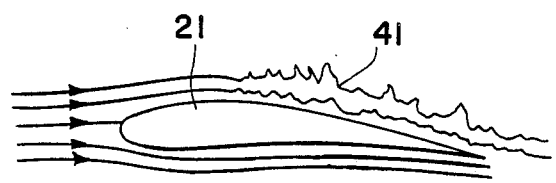
FIG. 4 depicts an airfoil cross-section showing undamped turbulence flow.
Figure 5:
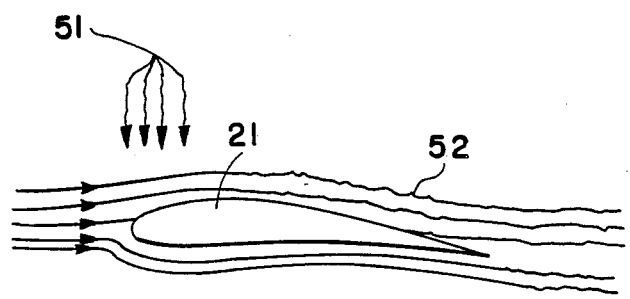
FIG. 5 depicts an airfoil cross-section showing turbulent flow damped by the present invention.

Referring to FIGS. 4 and 5, use of the control portion of the present invention is depicted. FIG. 4 shows the larger and more unstable velocity oscillations 41 in natural turbulent flow. FIG. 5 shows the effect on airfoil 21 where use of a suppressing wave 51 results in damped turbulent flow 52. As a result of the much reduced oscillations in the flow field, skin friction is greatly reduced. Experimentally, the effect is similar to shifting to a higher Reynold's number thereby achieving a significant reduction in skin friction drag.

The results of experimental data are presented in FIGS. 6 and 7 where FIG. 6 depicts the amplitude of turbulent perturbations 61 when excited by heating impulse 62. FIG. 7 shows the smoothing of the amplitudes 71 where the acoustic damping is applied.

Achieving the aforementioned results with the present invention requires a heating element trigger located in a region of laminar flow and preferably in a region of positive pressure gradient. Initial triggering of the flow to turbulent is accomplished in order to establish predictable flow oscillations. FIG. 8 depicts a complete schematic of the present invention showing airfoil 21 with heating element trigger 24 embedded in the upper leading edge region. Laminar to turbulent transition occurs at element 24 resulting in turbulent boundary layer flow 52. A sensor 81 located along airfoil 21 measures amplitude and frequency of boundary layer oscillations. The sensor used in the test apparatus of the present invention was a hot wire anemometer commercially available. However, other equally suited types of flow sensing means are available such as hot-film sensors, laser velocimeters and the like. The only requirement is that the sensor be responsive to the frequency and amplitude range of the boundary layer based on flow Reynolds number, velocity, temperature and density. A feedback mechanism 82, driven by power supply 84, amplifies and time shifts the sensor inputs in order to produce a damping wave 51. The feedback mechanism used in test apparatus comprised a common audio amplifier and a phase-reversal circuit. Best mode of the present invention also requires an automatic nulling circuit to provide for adjustment of the speaker output so as to minimize downstream turbulence. A variety of commercially available nulling circuits are suitable. This wave is emitted from speakers 83 located within the airfoil 21 or outside the airfoil in a position that will allow impingement of the damping wave 51 on the flow field 52. The preferred placement of the audio speaker is near the beginning of the turbulent flow region. The speaker may, therefore, be located immediately ahead or behind the triggering element 24. Changing the location of the speaker from inside the wing section to inside the fuselage, does not alter the effect of the invention. Since the dynamics the present invention depend on sound patterns in the air flow, and not on vibration of the wing surface, both locations are equally suitable. For optimal results, the speaker should be located upstream, where the flow will transport the acoustic energy to the turbulent region, and aimed to direct acoustic energy toward the turbulent region. Further, although for purposes of illustration the invention is shown on the wing surface, it is also effective in reducing skin friction along the fuselage skin or along any vehicular body. The object is to envelop the entire vehicle in a field of acoustic energy which will actively control the flow field. Control is active in the sense that a time-dependent signal is generated to suppress boundary layer disturbances.

Figure 9:
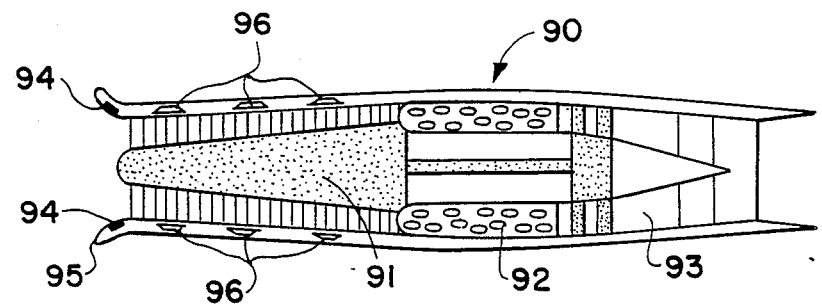
FIG. 9 is a depiction of the present invention as applied to internal duct flow.

Other uses of the present invention can be made in internal duct flow and in hydrodynamic applications. FIG. 9 depicts a jet engine 90 having a compressor section 91, a combustor section 92, and an exhaust section 93. Embedded in the lip 95 of the intake is the trigger 94 of the present invention. Acoustic generators 96 are embedded in the compressor section to control flow within the duct. The frequency and amplitude flexibility of the present invention allows a complex wave form to be output to the duct interior. Because of this feature, the present invention can provide control to complex flow patterns as shown here.

Figure 10:
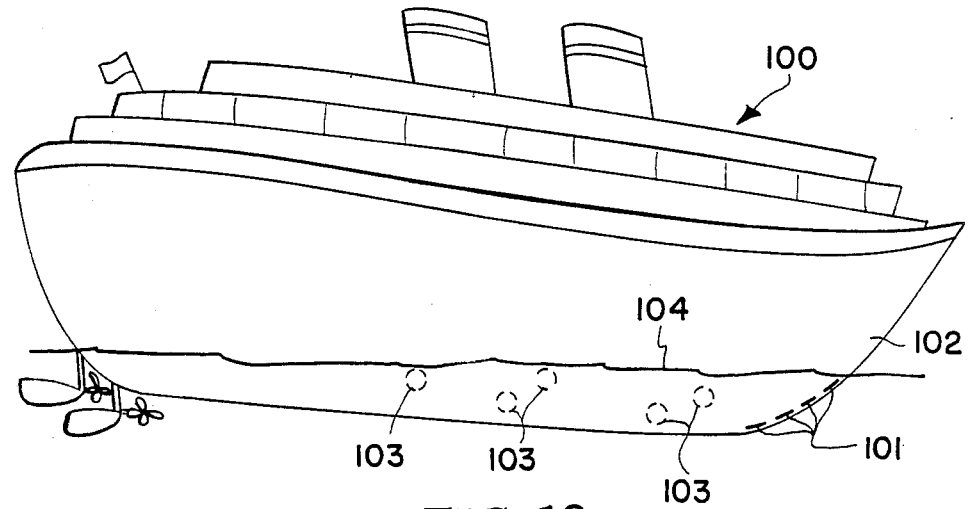
FIG. 10 shows the present invention applied to the hull of a ship.

Another application of the present invention is shown in FIG. 10, wherein the a ship 100 is fitted to control flow disturbances. Heating elements 101 near the bow 102 of the ship trigger turbulent flow. Embedded speaker 103 below waterline 104 damp flow oscillations further downstream thereby reducing skin friction drag.

Although specific embodiments of the invention have been described herein, they are to be considered as exemplary of the novel features thereof and are not exhaustive. There are many variations and modifications of these specific examples which will be readily apparent to those skilled in the art in light of the above teachings without departing from the scope of the appended claims. It is therefore understood that this invention may be practiced otherwise than as specifically described herein.

What is claimed as new and desired to be secured by Letters Patent of the United States is:

1. A system for active control of boundary layer flow comprising in combination:
   a flow surface;
   a plurality of heater strips are embedded in and flush with said flow surface and extending spanwise along said surface in a region of positive pressure gradient for triggering boundary layer transition from laminar to turbulent flow;
   sensor means disposed on said flow surface for sensing flow oscillations thereon downstream of said triggering means;
   feedback means connected to said sensor means; and
   means for controlling the amplitude of turbulent boundary layer oscillations over a broad frequency band connected to and activated by said feedback means.

2. A system as in claim 1 wherein the flow surface is the surface of an airfoil.

3. A system as in claim 1 wherein said sensor means comprises a hot wire probe responsive to the amplitude and frequency of the flow oscillations.

4. A system as in claim 1 wherein said feedback means comprises a signal generator and electronic circuitry which provides the out-of-phase signal matched to the frequency and amplitude characteristics of the boundary layer oscillations.

5. A system as in claim 1 wherein said means for controlling the amplitude of turbulent boundary layer comprises an audio speaker.

6. A system as in claim 1 wherein the flow surface is the surface of an airfoil and said means for controlling the amplitude of turbulent oscillations comprises an audio speaker which is mounted external to the airfoil.

7. A system as in claim 1 wherein the flow surface is the surface of an airfoil and said means for controlling the amplitude of turbulent oscillations comprises an audio speaker which is mounted internal to said airfoil.

8. A system as in claim 1 wherein said flow surface comprises an aircraft fuselage.

9. A system as in claim 1 wherein the flow surface comprises the hull of a hydrodynamic vehicle.

10. A system as in claim 1 wherein the flow surface comprises an internal surface of a duct.

11. A system as in claim 1 wherein the flow surface is the interior surfaces of a jet engine.

12. A method of reducing skin friction drag over flow surfaces by suppressing turbulent oscillations comprising the steps of:
    providing a flow surface;
    triggering boundary layer transition from laminar to turbulent using heater strips over the flow surface;
    measuring amplitude and frequency of turbulent boundary layer oscillations occurring over the flow surface;
    generating an audio wave matched in frequency and amplitude to the natural boundary layer oscillations;
    propagating said audio wave into the boundary layer so that the wave is out-of-phase with natural oscillations; and
    thereby reducing skin friction drag.

* * * * *